(12) United States Patent
Hasegawa

(10) Patent No.: US 11,899,309 B2
(45) Date of Patent: Feb. 13, 2024

(54) ELECTRONIC APPARATUS COMPRISING A PLURALITY OF FIRST LIGHT SOURCES AND A PLURALITY OF SECOND LIGHT SOURCES EACH HAVING A LIGHT-EMITTING SURFACE SMALLER THAN THAT OF EACH OF THE FIRST LIGHT SOURCES

(71) Applicant: Japan Display Inc., Tokyo (JP)

(72) Inventor: Makoto Hasegawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 88 days.

(21) Appl. No.: 17/553,068

(22) Filed: Dec. 16, 2021

(65) Prior Publication Data

US 2022/0107532 A1    Apr. 7, 2022

Related U.S. Application Data

(63) Continuation of application No. PCT/JP2020/022072, filed on Jun. 4, 2020.

(30) Foreign Application Priority Data

Jun. 18, 2019  (JP) .................................. 2019-112846

(51) Int. Cl.
  *G02F 1/13357*  (2006.01)
  *G02F 1/1333*   (2006.01)
  *G02F 1/1335*   (2006.01)

(52) U.S. Cl.
  CPC .... *G02F 1/133606* (2013.01); *G02F 1/13332* (2021.01); *G02F 1/133524* (2013.01); *G02F 1/133603* (2013.01)

(58) Field of Classification Search
  CPC ............................. G02F 1/13332; F21V 9/32
  See application file for complete search history.

(56) References Cited

U.S. PATENT DOCUMENTS

| | | | | |
|---|---|---|---|---|
| 2008/0175023 A1* | 7/2008 | Lee | ................... | G02F 1/133615 362/613 |
| 2010/0149834 A1* | 6/2010 | Kim | ..................... | G02B 6/0068 362/613 |

(Continued)

FOREIGN PATENT DOCUMENTS

| | | | | |
|---|---|---|---|---|
| CN | 105700231 A | * | 6/2016 | ........... G02B 6/0068 |
| JP | 2003-123525 A | | 4/2003 | |

(Continued)

OTHER PUBLICATIONS

Office Action dated Nov. 22, 2022, in corresponding Japanese Application No. 2019-112846, 9 pages.

(Continued)

*Primary Examiner* — Paul C Lee
(74) *Attorney, Agent, or Firm* — Maier & Maier, PLLC

(57) ABSTRACT

According to one embodiment, an electronic apparatus comprises a liquid crystal panel, and an illumination device that illuminates the liquid crystal panel, wherein the illumination device includes a light guide having a recess portion recessed from a first side surface toward a second side surface on the first side surface, and a third side surface exposed by the recess portion and opposed to the second side surface, a plurality of first light sources opposed to the first side surface, and a plurality of second light sources located in the recess portion and opposed to the third side surface, and each of the second light sources has a light-emitting surface smaller than that of each of the first light sources.

6 Claims, 6 Drawing Sheets

(56) References Cited

U.S. PATENT DOCUMENTS

2013/0121020 A1* 5/2013 Liu ................ G02B 6/0068
362/613
2017/0053592 A1 2/2017 Shin et al.

FOREIGN PATENT DOCUMENTS

| JP | 2008-177170 A | | 7/2008 |
|---|---|---|---|
| JP | 2010-33871 A | | 2/2010 |
| JP | 2010033871 A | * | 2/2010 |
| JP | 2017-40908 A | | 2/2017 |

OTHER PUBLICATIONS

International Search Report dated Jul. 14, 2020 in PCT/JP2020/022072, filed on Jun. 4, 2020, 2 pages.

* cited by examiner

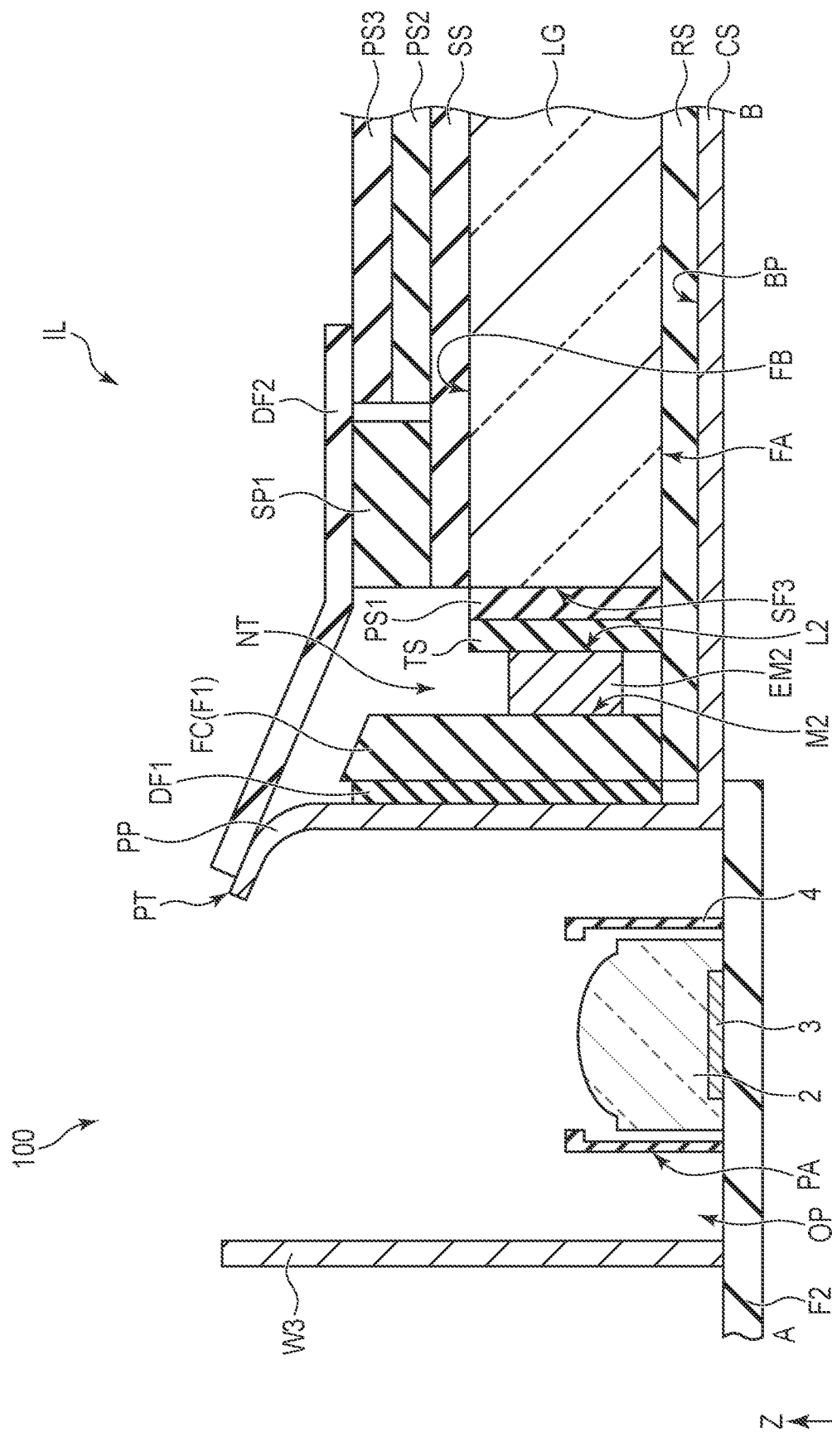
F I G. 3

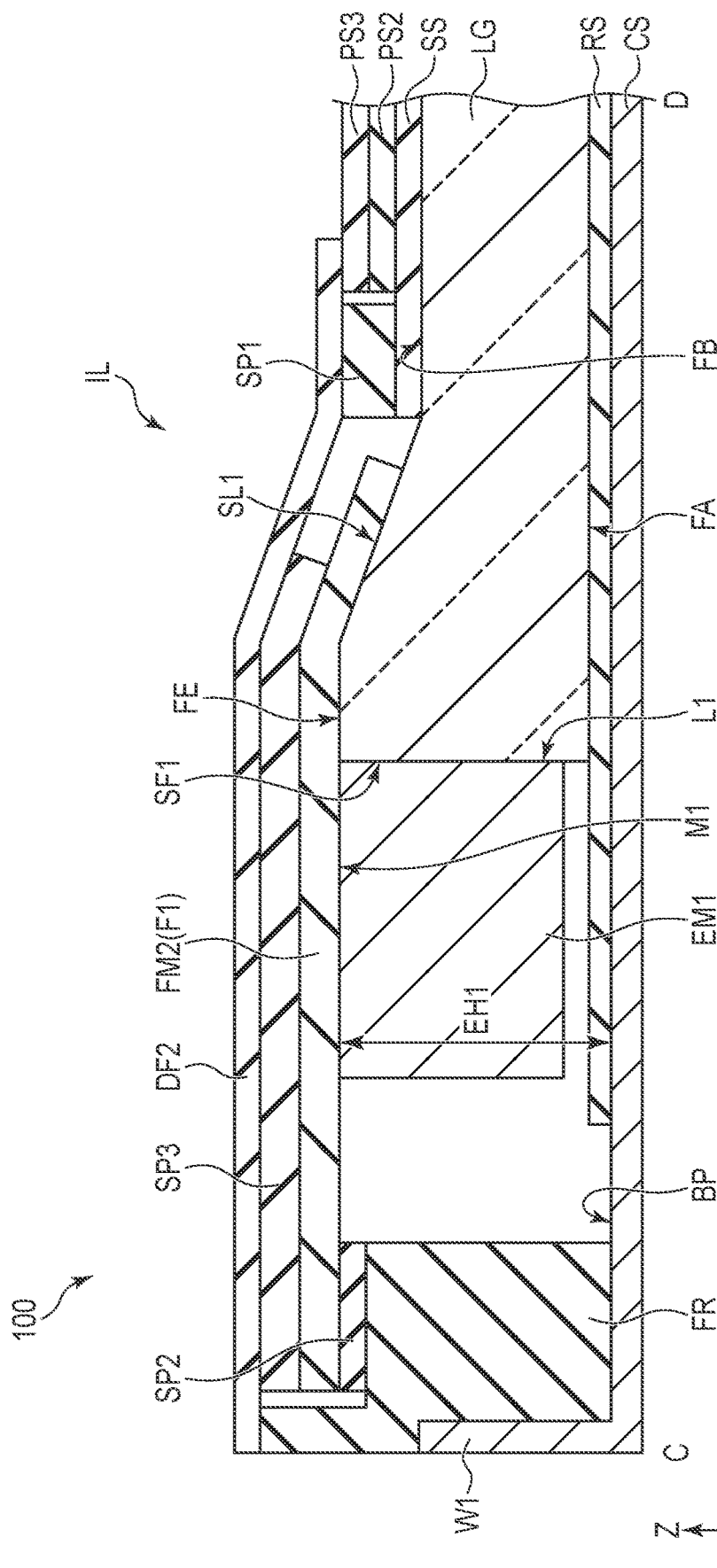
F I G. 4

ELECTRONIC APPARATUS COMPRISING A PLURALITY OF FIRST LIGHT SOURCES AND A PLURALITY OF SECOND LIGHT SOURCES EACH HAVING A LIGHT-EMITTING SURFACE SMALLER THAN THAT OF EACH OF THE FIRST LIGHT SOURCES

CROSS-REFERENCE TO RELATED APPLICATIONS

This application is a Continuation Application of PCT Application No. PCT/JP2020/022072, filed Jun. 4, 2020, and based upon and claiming the benefit of priority from Japanese Patent Application No. 2019-112846, filed Jun. 18, 2019, the entire contents of all of which are incorporated herein by reference.

FIELD

Embodiments described herein relate generally to an electronic apparatus.

BACKGROUND

In recent years, an electronic apparatus such as a smartphone including a display unit and a camera on the same surface side have been widely put into practical use. In such an electronic apparatus, the camera is provided on an outer side of the display unit, and there is an increasing demand for securing a space for installing the camera and reducing a frame width on the outer side of the display unit.

BRIEF DESCRIPTION OF THE DRAWINGS

FIG. 3 is a cross-sectional view of the electronic apparatus illustrated in FIG. 2 and taken along line A-B.

FIG. 4 is a cross-sectional view of the electronic apparatus illustrated in FIG. 2 and taken along line C-D.

DETAILED DESCRIPTION

Figure 1:
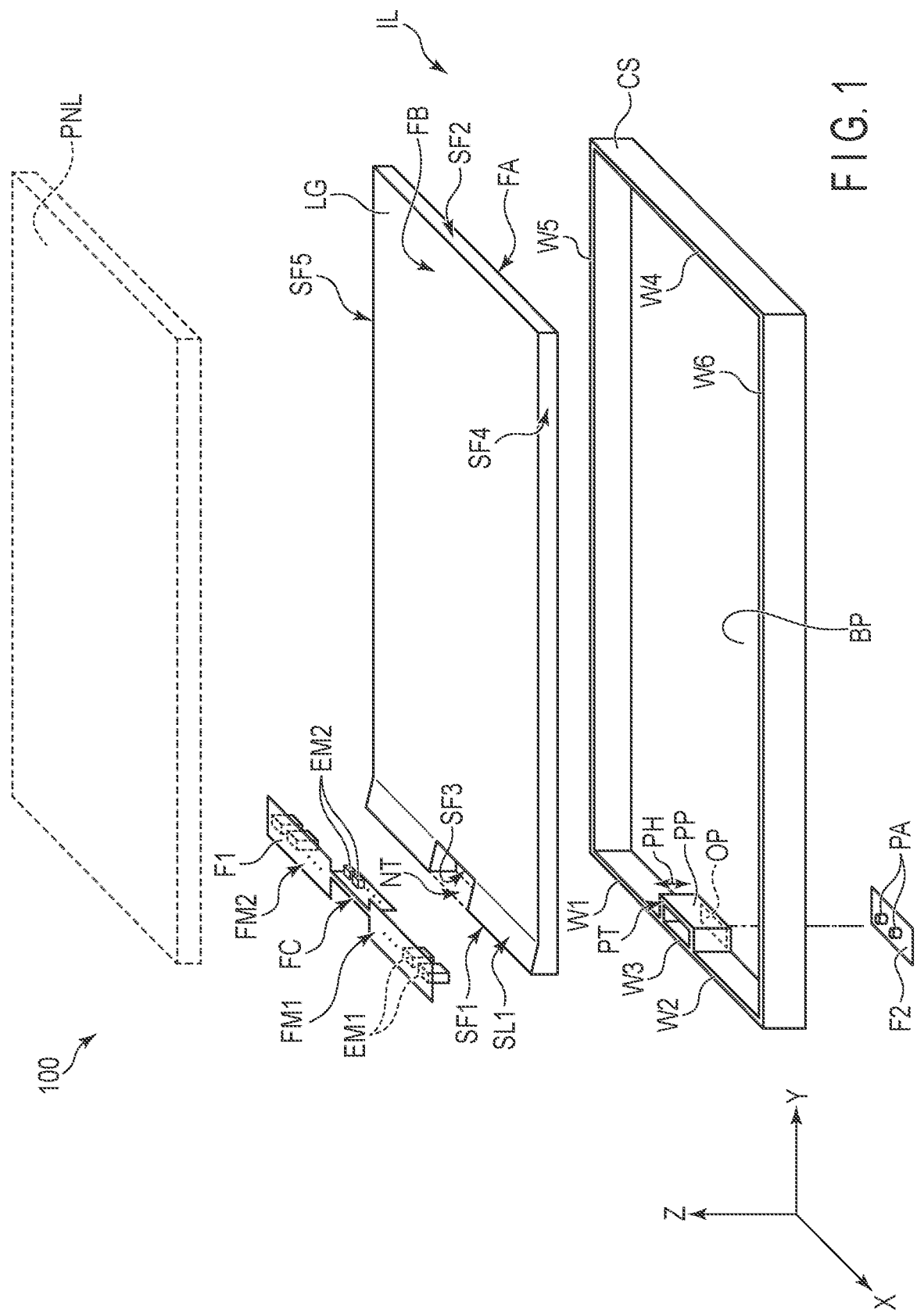
FIG. 1 is an exploded perspective view illustrating a configuration example of an electronic apparatus including an illumination device according to an embodiment.

In general, according to one embodiment, an electronic apparatus comprises a liquid crystal panel; and an illumination device that illuminates the liquid crystal panel, wherein the illumination device includes a light guide having a first surface facing the liquid crystal panel, a first side surface, a second side surface on an opposite side of the first side surface, a recess portion recessed from the first side surface toward the second side surface on the first side surface, and a third side surface exposed by the recess portion and opposed to the second side surface, a plurality of first light sources opposed to the first side surface, and a plurality of second light sources located in the recess portion and opposed to the third side surface, and each of the second light sources has a light-emitting surface smaller than that of each of the first light sources.

According to the present embodiment, it is possible to provide the illumination device of which a frame is capable of being narrowed and the electronic apparatus including the illumination device.

Embodiments will be described hereinafter with reference to the accompanying drawings.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof may be omitted unless otherwise necessary.

FIG. 1 is an exploded perspective view illustrating a configuration example of an electronic apparatus 100 including an illumination device IL according to an embodiment.

As illustrated in FIG. 1, a first direction X, a second direction Y, and a third direction Z are orthogonal to each other, but may intersect with each other at an angle of other than 90 degrees.

The illumination device IL includes a light guide LG, a light source EM1, a light source EM2, and a case CS. Such an illumination device IL illuminates, for example, a liquid crystal panel PNL simplified by a broken line in FIG. 1.

The light guide LG is formed in an approximately flat plate shape parallel to an X-Y plane defined by the first direction X and the second direction Y. The light guide LG includes main surfaces FA and FB, side surfaces SF1 to SF5, an inclined surface SL1, and a recess portion NT. The main surfaces FA and FB are surfaces parallel to the X-Y plane. The main surface FB is located on an opposite side of the main surface FA and faces the liquid crystal panel PNL. The side surfaces SF1 to SF3 are surfaces parallel to an X-Z plane defined by the first direction X and the third direction Z. The side surface SF2 is located on the opposite side of the side surface SF1. In the example illustrated, the side surface SF1 is larger than the side surface SF2 in the third direction Z. The recess portion NT is a recess portion recessed from the side surface SF1 toward the side surface SF2 on the side surface SF1. In the example illustrated, the recess portion NT is a notch penetrating from the main surface FB to the main surface FA. The side surface SF3 is a surface exposed by the recess portion NT and opposed to the side surface SF2. The side surfaces SF4 and SF5 are surfaces parallel to the Y-Z plane defined by the second direction Y and the third direction Z. The inclined surface SL1 is a surface that is located between the side surface SF1 and the main surface FB and is inclined in each of the second direction Y and the third direction Z.

A wiring board F1 includes first mounting portions FM1 and FM2, and a second mounting portion FC. The first mounting portions FM1 and FM2 are, for example, parallel to the X-Y plane and extend in the first direction X. The first mounting portions FM1 and FM2 overlap the side surface SF1 in the third direction Z. The second mounting portion FC is, for example, parallel to the X-Z plane and extends in the third direction Z. The second mounting portion FC is located between the first mounting portion FM1 and the first mounting portion FM2. The second mounting portion FC overlaps the recess portion NT in the third direction Z. The wiring board F1 is, for example, a flexible printed circuit that is bendable.

A plurality of the light sources EM1 are arranged at intervals in the first direction X. Each of the light sources EM1 is mounted on each of the first mounting portions FM1 and FM2, and is electrically connected to the wiring board F1. A plurality of the light sources EM2 are arranged at intervals in the first direction X. Each of the light sources EM2 is mounted on the second mounting portion FC and electrically connected to the wiring board F1. The light sources EM1 and EM2 are, for example, light-emitting diodes (LEDs). In a case where the first mounting portions FM1 and FM2, and the second mounting portion FC are integrally formed, since a wiring connected to each of the light sources EM1 and a wiring connected to each of the light sources EM2 are different, the wiring board is provided with wirings of two systems. Alternatively, the second mounting portion FC may be formed separately from the first mounting portions FM1 and FM2, and in this case, the light sources EM1 and EM2 are respectively mounted on different wiring boards.

The case CS accommodates the light guide LG, and the light sources EM1 and EM2. The case CS is made of, for example, metal such as stainless steel. The case CS has wall portions W1 to W6, a bottom portion BP, an opening portion OP, and a protruding portion PP.

The wall portions W1 to W3 extend in the first direction X, respectively. The wall portion W3 is located between the wall portion W1 and the wall portion W2. The wall portion W4 extends in the first direction X and is opposed to the wall portions W1 to W3. The wall portions W5 and W6 extend in the second direction Y and are opposed to each other. The wall portion W5 is connected to the wall portion W1, the wall portion W6 is connected to the wall portion W2, and the wall portion W4 is connected to the wall portions W5 and W6. The bottom portion BP is, for example, a surface parallel to the X-Y plane. The bottom portion BP faces the main surface FA. The opening portion OP is a through hole penetrating the bottom portion BP in the third direction Z. The opening portion OP overlaps the recess portion NT in the third direction Z. The protruding portion PP is formed so as to protrude from the bottom portion BP in the third direction Z and surround the opening portion OP. The protruding portion PP has a height PH and has an end portion PT located on the opposite side of the bottom portion BP. The height PH corresponds to a length from the bottom portion BP to the end portion PT in the third direction Z. In the example illustrated, the protruding portion PP is formed on the wall portion W3. However, in a case where the case CS does not have the wall portion W3, the protruding portion PP may be formed so as to be continuous with each of the wall portions W1 and W2.

The electronic apparatus 100 including the illumination device IL is provided with a photoreceiver PA. The photoreceiver PA is provided so as to overlap the opening portion OP in the third direction Z. The photoreceiver PA is mounted on a wiring board F2, and is electrically connected to the wiring board F2.

In the present embodiment, the photoreceiver PA is, for example, a camera. Incidentally, for example, the photoreceiver PA may be a photoreceiver that detects visible light, a photoreceiver that detects infrared light, a proximity sensor that senses proximity of a detection target, a detection element that detects infrared light reflected from the detection target, or the like, or a combination thereof. The electronic apparatus 100 may include a light emitting element instead of the photoreceiver PA or in addition to the photoreceiver PA. An example of the light emitting element includes a projection element that projects infrared light toward the detection target. Alternatively, the electronic apparatus 100 may include a microphone, a speaker, and the like instead of the photoreceiver PA or in addition to the photoreceiver PA.

Figure 2:
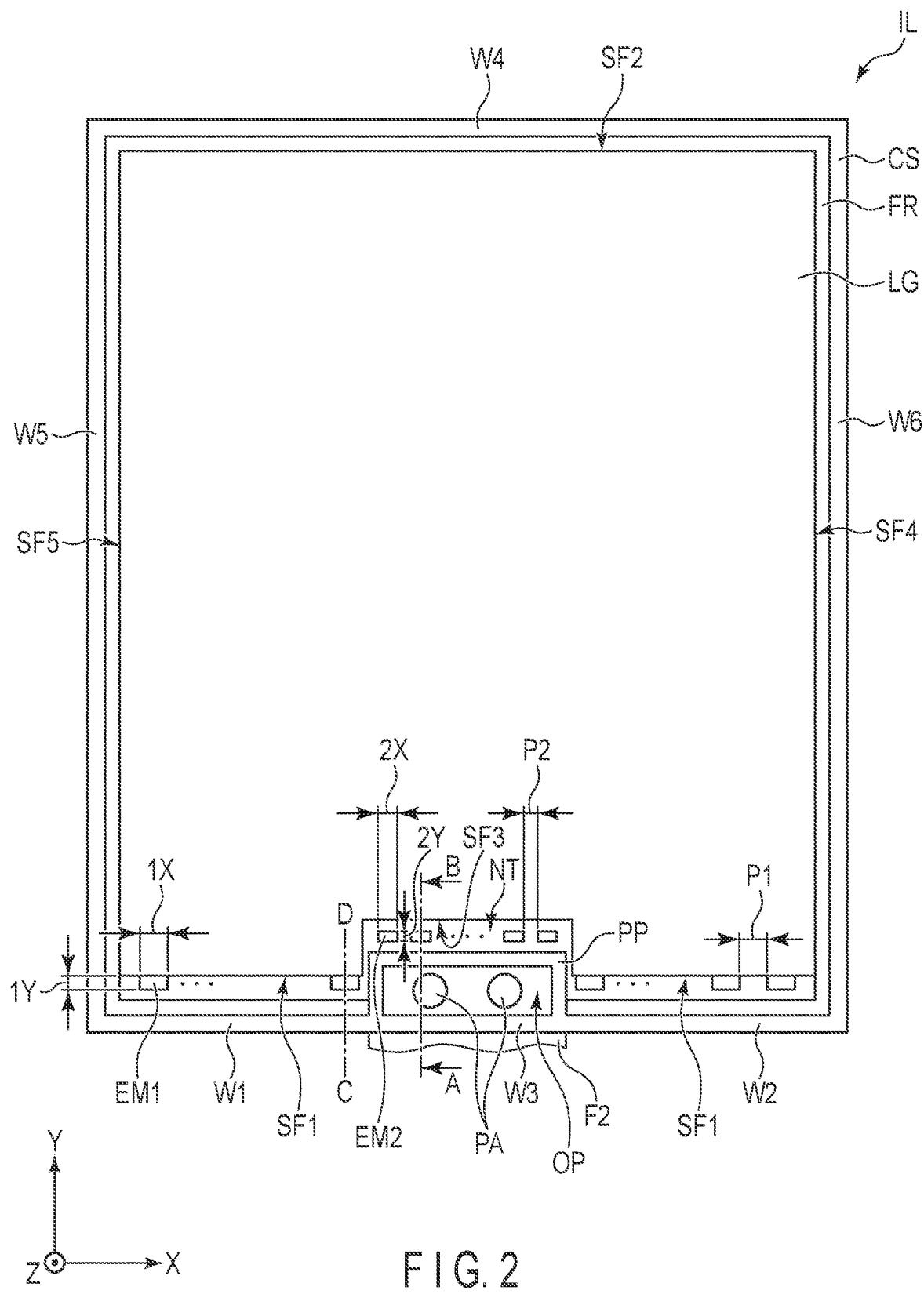
FIG. 2 is a plan view of the illumination device illustrated in FIG. 1.

FIG. 2 is a plan view of the illumination device IL illustrated in FIG. 1. Incidentally, illustration of the wiring board F1 illustrated in FIG. 1 will be omitted.

As illustrated in FIG. 2, the illumination device IL further includes a frame FR. The frame FR extends between the wall portion W1 and the side surface SF1, between the wall portion W5 and the side surface SF5, between the wall portion W4 and the side surface SF2, between the wall portion W6 and the side surface SF4, and between the wall portion W2 and the side surface SF1. Incidentally, the frame FR is not provided between the side surface SF3 and the protruding portion PP. The protruding portion PP extends between the light source EM1 and the photoreceiver PA and between the light source EM2 and the photoreceiver PA.

The light source EM1 is opposed to the side surface SF1 and is away from the frame FR. The light source EM2 is located in the recess portion NT and is opposed to the side surface SF3 in planar view. The light source EM2 is separated from each of the side surface SF3 and the protruding portion PP. The side surface SF1 and the side surface SF3 are opposed to the side surface SF2.

The light source EM1 has a length 1X in the first direction X and a length 1Y in the second direction Y. The light source EM2 has a length 2X in the first direction X and a length 2Y in the second direction Y. For example, each of the lengths 2X and 2Y is about 0.3 mm or less. The length 2X is smaller than the length 1X, and the length 2Y is smaller than the length 1Y. The light source EM2 is smaller than the light source EM1. An interval P2 between the adjacent light sources EM2 is smaller than an interval P1 between the adjacent light sources EM1. Each of the intervals P1 and P2 corresponds to a length or a distance in the first direction X.

FIG. 3 is a cross-sectional view of the electronic apparatus 100 illustrated in FIG. 2 and taken along line A-B. Here, a cross section of the electronic apparatus 100 in the second direction Y, which includes the photoreceiver PA and the wiring board F2, is illustrated.

As illustrated in FIG. 3, the illumination device IL further includes double-faced tapes DF1 and DF2, a reflective sheet RS, a diffusion sheet SS, prism sheets PS1 to PS3, a wavelength conversion element TS, and a spacer SP1.

The second mounting portion FC, the double-faced tape DF1, the light source EM2, the wavelength conversion element TS, and the prism sheet PS1 are each located in the recess portion NT.

The second mounting portion FC and the double-faced tape DF1 are located between the light source EM2 and the protruding portion PP. The double-faced tape DF1 is, for example, a double-faced tape having adhesive surfaces on both sides. The double-faced tape DF1 adheres to each of the protruding portion PP and the second mounting portion FC. The second mounting portion FC is fixed to the protruding portion PP by the double-faced tape DF1. The second mounting portion FC is located between the protruding portion PP and the side surface SF3. The second mounting portion FC has a mounting surface M2 on which the light source EM2 is mounted. The mounting surface M2 is opposed to the side surface SF3.

The wavelength conversion element TS and the prism sheet PS1 are located between the light source EM2 and the side surface SF3 of the light guide LG. The wavelength conversion element TS absorbs light radiated from the light source EM2 and emits light having a wavelength longer than a wavelength of the absorbed light. The prism sheet PS1 condenses the light converted by the wavelength conversion element TS in a direction of an arrow of the second direction Y. The wavelength conversion element TS includes, for example, a quantum dot as an emitting material, but is not limited thereto, and may include a material that emits fluorescence or phosphorescence.

For example, the light source EM2 emits light (excitation light) having an ultraviolet wavelength. The wavelength conversion element TS absorbs the excitation light, emits blue light, green light, and red light, and generates white illumination light.

For example, the light source EM2 emits the light (excitation light) having a blue wavelength. The wavelength conversion element TS absorbs the excitation light and emits yellow light. Therefore, the white illumination light, in which the yellow light as converted light and the blue light as unconverted light are mixed, is generated.

Incidentally, in a case where the light source EM2 emits the white light, the wavelength conversion element TS may not be provided.

The light source EM2 has a light-emitting surface L2 opposite to the side surface SF3. In the example illustrated, the light source EM2 is a front view type LED in which the mounting surface M2 and the light-emitting surface L2 are opposed to each other. The light source EM2 is located between the main surface FA and the main surface FB in the third direction Z. For example, in a state where a conductive adhesive containing conductive particles is provided between a bump of the light source EM2 and a terminal of the second mounting portion FC, the light source EM2 and the second mounting portion FC are pressurized and heated, and thus the light source EM2 and the second mounting portion FC approach each other. Accordingly, the bump of the light source EM2 and the terminal of the second mounting portion FC are electrically and physically connected.

The reflective sheet RS, the light guide LG, the diffusion sheet SS, the prism sheets PS2 and PS3 are disposed in this order in the third direction Z. The reflective sheet RS is provided on the bottom portion BP. In the example illustrated, the reflective sheet RS is in contact with the second mounting portion FC, the wavelength conversion element TS, the prism sheet PS1, and the main surface FA of the light guide LG, and extends between the light source EM2 and the bottom portion BP. The diffusion sheet SS is provided on the main surface FB. The prism sheets PS1 and PS2 are stacked on the diffusion sheet SS.

The spacer SP1 is located between the diffusion sheet SS and the double-faced tape DF2. The double-faced tape DF2 bonds the illumination device IL and the liquid crystal panel PNL together. The double-faced tape DF2 is in contact with the protruding portion PP, the spacer SP1, and the prism sheet PS3. The double-faced tape DF2 is not in contact with the wall portion W3.

The photoreceiver PA is located between the wall portion W3 and the protruding portion PP. The photoreceiver PA includes, for example, an optical system 2 including at least one lens, an image sensor (imaging element) 3, and a case 4. The case 4 accommodates the optical system 2 and the image sensor 3. The image sensor 3 is located between the optical system 2 and the wiring board F2.

FIG. 4 is a cross-sectional view of the electronic apparatus 100 illustrated in FIG. 2 and taken along line C-D.

As illustrated in FIG. 4, the illumination device IL further includes a spacer SP2 and a spacer SP3. The light guide LG has a surface FE. The surface FE is, for example, the X-Y plane, and is connected to each of the side surface SF1 and the inclined surface SL1. The inclined surface SL1 is connected to each of the main surface FB and the surface FE.

The first mounting portion FM2 has a mounting surface M1 on which the light source EM1 is mounted. The light source EM1 has a height EH1. The height EH1 corresponds to a length from the bottom portion BP to the mounting surface M1 in the third direction Z. The height EH1 is smaller than the height PH illustrated in FIG. 1. In other words, the light source EM1 is located between the bottom portion BP and the end portion PT in the third direction Z. In the example illustrated, the light source EM1 is located between the main surface FA and the surface FE. The light source EM1 has a light-emitting surface L1 opposed to the side surface SF1. The light-emitting surface L1 is in contact with the side surface SF1. In the example illustrated, the light source EM1 is a side view type LED in which the mounting surface M1 and the light-emitting surface L1 are orthogonal to each other. The light source EM1 is soldered to, for example, the wiring board F1.

Incidentally, the height EH1 of the light source EM1 is larger than the thickness of the light guide LG (interval between the main surface FA and the main surface FB in the third direction Z). In addition, the height EH1 is larger than the height of the light source EM2 in the third direction Z. Furthermore, an area of the light-emitting surface L1 of the light source EM1 is formed to be larger than an area of the light-emitting surface L2 of the light source EM2. In other words, the light-emitting surface L2 of the light source EM2 is smaller than the light-emitting surface L1 of the light source EM1.

The frame FR is provided on the bottom portion BP, opposed to the light source EM1, and in contact with the wall portion W1. The spacer SP2 is located between the frame FR and the first mounting portion FM2, and the spacer SP3 is located between the first mounting portion FM2 and the double-faced tape DF2. The first mounting portion FM2 is in contact with each of the surface FE and the inclined surface SL1. The reflective sheet RS extends between the light source EM1 and the bottom portion BP. The double-faced tape DF2 is in contact with each of the frame FR, the spacer SP3, the spacer SP1, and the prism sheet PS3.

According to the present embodiment, the light sources EM1 are opposed to the side surface SF1, and the light sources EM2 are provided in the recess portion NT and opposed to the side surface SF3. The light emitted from the light source EM1 enters the light guide LG from the side surface SF1, and travels in the light guide LG from the side surface SF1 toward the side surface SF2 in the second direction Y. The light emitted from the light source EM2 enters the light guide LG from the side surface SF3, and travels in the light guide LG from the side surface SF3 toward the side surface SF2 in the second direction Y. The light emitted from the light source EM1 propagates in a region between the side surface SF1 and the side surface SF2, and the light emitted from the light source EM2 propagates in a region between the side surface SF3 and the side surface SF2. Accordingly, on the light incident side of the illumination device IL (side on which the light guide LG is opposed to the light source), non-uniformity of brightness of the illumination light, which is caused by providing the recess portion NT in the light guide LG, can be reduced.

In addition, since the recess portion NT can be provided on the light incident side (side surface SF1) of the light guide LG, a photoreceiver, a microphone, a speaker, and the like can be disposed in a space (between the wall portion W3 and the protruding portion PP) formed by the recess portion NT.

In addition, the protruding portion PP surrounds the opening portion OP in which the photoreceiver PA is provided, and extends between the photoreceiver PA and the light source EM1 and between the photoreceiver PA and the light source EM2. The light sources EM1 and EM2 are located between the bottom portion BP and the end portion PT of the protruding portion PP. Accordingly, since the protruding portion PP shields the light emitted from the light sources EM1 and EM2 to the photoreceiver PA, it is possible to prevent the photoreceiver PA from being affected by the illumination light emitted from each of the light sources EM1 and EM2 when the photoreceiver PA is activated.

In addition, since the light source EM2 is smaller than the light source EM1, it is possible to suppress an increase in the frame width of the illumination device IL, which is caused by providing the light source EM2 in the recess portion NT, and to narrow the frame of the illumination device IL.

In addition, the light sources EM1 and EM2 are mounted on the same wiring board F1. As compared with a case where each of the light sources EM1 and EM2 is mounted on a separate wiring board, the number of members can be reduced, and manufacturing cost can be reduced.

In the present embodiment, the light source EM1 corresponds to a first light source, the light source EM2 corresponds to a second light source, the main surface FB corresponds to a first surface, the main surface FA corresponds to a second surface, the side surface SF1 corresponds to a first side surface, the side surface SF2 corresponds to a second side surface, and the side surface SF3 corresponds to a third side surface.

Figure 5:
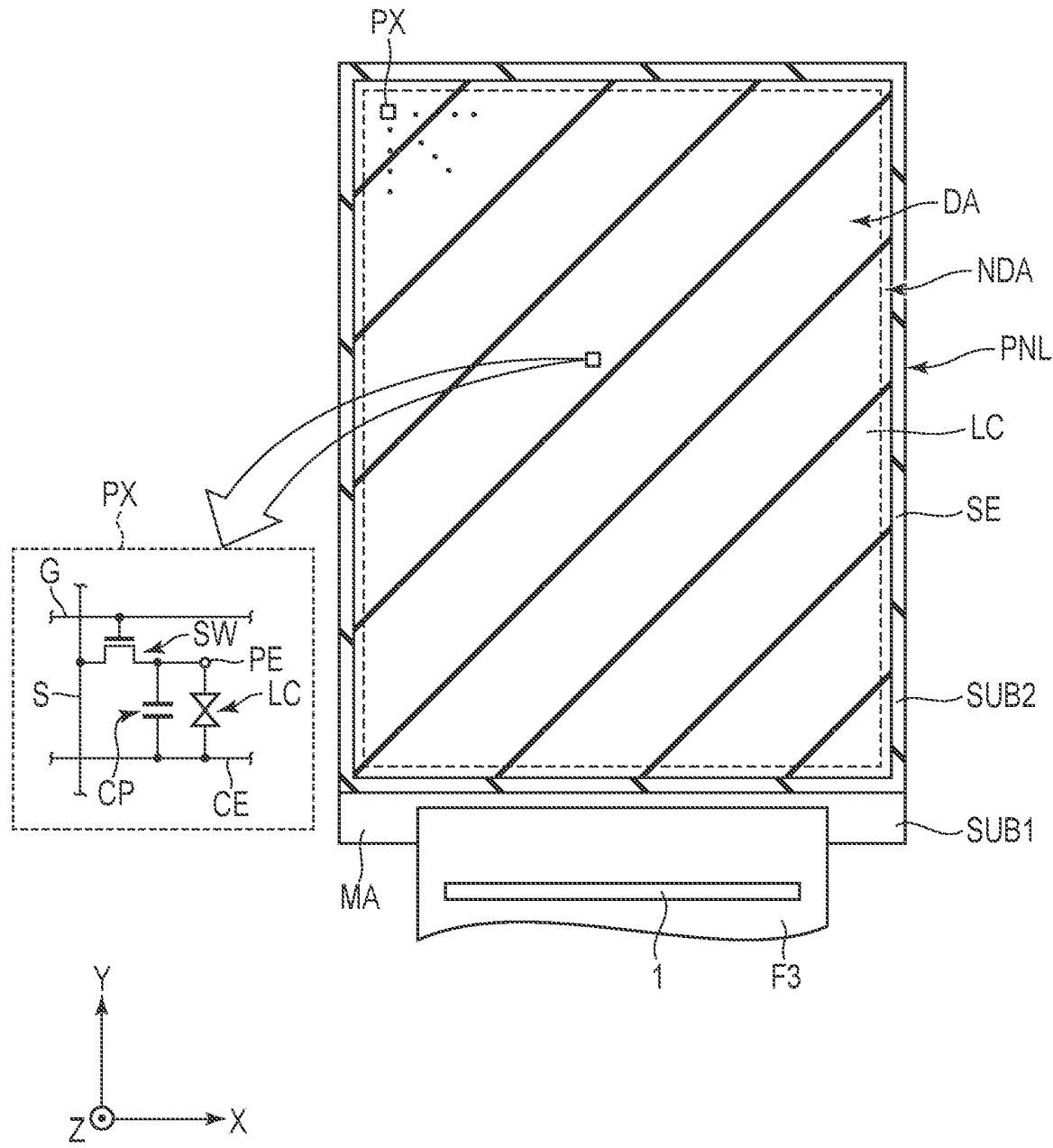
FIG. 5 is a plan view illustrating a configuration example of a liquid crystal panel illustrated in FIG. 1.

FIG. 5 is a plan view illustrating a configuration example of the liquid crystal panel PNL illustrated in FIG. 1.

As illustrated in FIG. 5, the liquid crystal panel PNL includes a first substrate SUB1, a second substrate SUB2, a liquid crystal layer LC, and a sealant SE. The first substrate SUB1 and the second substrate SUB2 are formed in a flat plate shape parallel to the X-Y plane. The first substrate SUB1 and the second substrate SUB2 overlap each other in planar view. The first substrate SUB1 and the second substrate SUB2 are bonded by the sealant SE. The liquid crystal layer LC is held between the first substrate SUB1 and the second substrate SUB2, and is sealed by the sealant SE. In FIG. 5, the liquid crystal layer LC and the sealant SE are indicated by different oblique lines.

The liquid crystal panel PNL includes a display portion DA that displays an image, and a frame-shaped non-display portion NDA that surrounds the display portion DA. The sealant SE is located in the non-display portion NDA. The display portion DA includes pixels PX arranged in a matrix in the first direction X and the second direction Y.

As illustrated in an enlarged manner in FIG. 5, each of the pixels PX includes a switching element SW, pixel electrodes PE, a common electrode CE, the liquid crystal layer LC, and the like. The switching element SW includes, for example, a thin-film transistor (TFT), and is electrically connected to a scanning line G and a signal line S. The scanning line G is electrically connected to the switching element SW in each of the pixels PX arranged in the first direction X. The signal line S is electrically connected to the switching element SW in each of the pixels PX arranged in the second direction Y. Each of the pixel electrodes PE is electrically connected to the switching element SW. Each of the pixel electrodes PE is opposed to the common electrode CE, and drives the liquid crystal layer LC by an electric field generated between the pixel electrode PE and the common electrode CE. A capacitor CP is formed, for example, between an electrode having the same electric potential as that of the common electrode CE and an electrode having the same electric potential as that of the pixel electrode PE.

A wiring board F3 is mounted on and electrically connected to a mounting portion MA of the first substrate SUB1. An IC chip 1 is mounted on the wiring board F3 and electrically connected to the wiring board F3. Incidentally, the IC chip 1 may be mounted on the mounting portion MA and electrically connected to the mounting portion MA. The IC chip 1 incorporates, for example, a display driver that outputs a signal necessary for image display.

Figure 6:
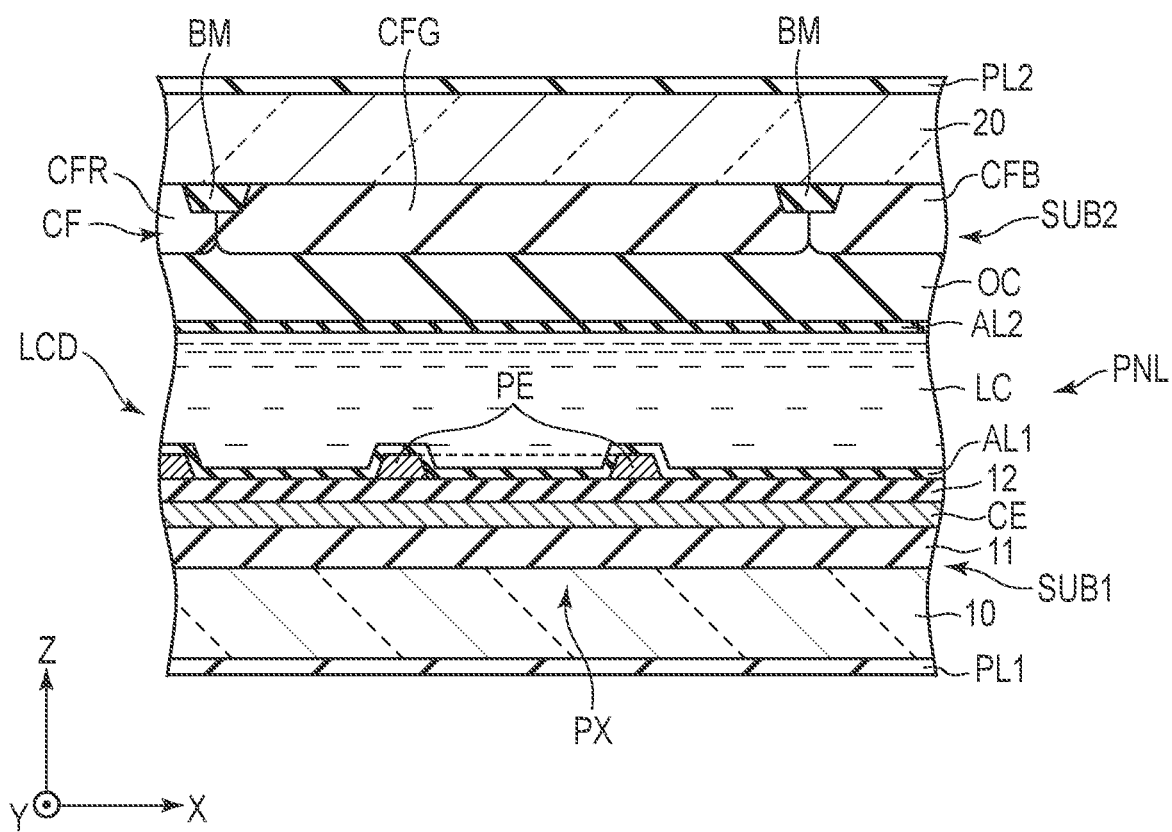
FIG. 6 is a cross-sectional view of the liquid crystal panel illustrated in FIG. 5.

FIG. 6 is a cross-sectional view of the liquid crystal panel PNL illustrated in FIG. 5.

As illustrated in FIG. 6, the first substrate SUB1 includes an insulating substrate 10, insulating layers 11 and 12, the common electrode CE, the pixel electrodes PE, and an alignment film AL1. Incidentally, the scanning line G, the signal line S, and the switching element SW, which are illustrated in FIG. 5, are located, for example, between the insulating substrate 10 and the common electrode CE. The insulating substrate 10 is a transparent substrate such as a glass substrate or a flexible resin substrate. The insulating layer 11 is located on the insulating substrate 10. The common electrode CE is located above the insulating layer 11 and covered by the insulating layer 12. The pixel electrodes PE are located on the insulating layer 12 and covered by the alignment film AL1. Each of the pixel electrodes PE is opposed to the common electrode CE via the insulating layer 12. The common electrode CE and the pixel electrode PE are made of a transparent conductive material such as indium tin oxide (ITO) or indium zinc oxide (IZO). The pixel electrode PE is a linear electrode, and the common electrode CE is a plate-like electrode provided in common over a plurality of the pixels PX. Incidentally, the pixel electrode PE may be a plate-like plate electrode, and a linear common electrode may be provided between the pixel electrode PE and the liquid crystal layer LC. The alignment film AL1 is in contact with the liquid crystal layer LC. The insulating layer 11 includes an inorganic insulating layer and an organic insulating layer, though not described in detail. The insulating layer 12 is, for example, the inorganic insulating layer such as silicon nitride.

The second substrate SUB2 includes an insulating substrate 20, a color filter CF, a light-shielding layer BM, a transparent layer OC, and an alignment film AL2. The insulating substrate 20 is a transparent substrate such as a glass substrate or a flexible resin substrate. The color filter CF, the light-shielding layer BM, and the transparent layer OC are located between the insulating substrate 20 and the liquid crystal layer LC. The alignment film AL2 is in contact with the liquid crystal layer LC. The transparent layer OC covers the color filter CF and the light-shielding layer BM. The transparent layer OC is, for example, a transparent organic insulating layer. Incidentally, in the example illustrated, the color filter CF is provided in the second substrate SUB2, but may be provided in the first substrate SUB1. The color filter CF includes a red color filter CFR, a green color filter CFG, and a blue color filter CFB. The green color filter CFG is opposed to the pixel electrode PE. The red color filter CFR and the blue color filter CFB are also each opposed to other pixel electrodes PE (not illustrated).

A polarizer PL1, the liquid crystal panel PNL, and a polarizer PL2 are disposed in this order in the third direction Z, and constitute a liquid crystal display LCD having an optical switch function for light traveling in the third direction Z. The polarizer PL1 is bonded to the insulating substrate 10, and the polarizer PL2 is bonded to the insulating substrate 20.

Here, the liquid crystal panel PNL corresponding to a display mode using a lateral electric field along a substrate surface has been described, but the liquid crystal panel PNL is not limited thereto, and may be any liquid crystal panel PNL corresponding to a display mode using a longitudinal electric field along a normal line of the substrate surface, a display mode using an inclined electric field angled with respect to the substrate surface, and a display mode using the lateral electric field, the longitudinal electric field, and the inclined electric field in an appropriate combination. Here, the substrate surface is a surface parallel to the X-Y plane.

As described above, it is possible to provide the illumination device of which the frame is capable of being narrowed and the electronic apparatus including the illumination device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a liquid crystal panel; and
an illumination device that illuminates the liquid crystal panel, wherein
the illumination device includes
a light guide having a first surface facing the liquid crystal panel, a first side surface, a second side surface on an opposite side of the first side surface, a recess portion recessed from the first side surface toward the second side surface on the first side surface, and a third side surface exposed by the recess portion and opposed to the second side surface,
a plurality of first light sources opposed to the first side surface,
a plurality of second light sources located in the recess portion and opposed to the third side surface, and
a wavelength conversion element that converts a wavelength of light from the second light source,
each of the second light sources has a light-emitting surface smaller than that of each of the first light sources, and
the wavelength conversion element is located between the second light source and the third side surface.

2. The electronic apparatus according to claim 1, wherein the illumination device further includes a wiring board having a first mounting portion extending in a first direction and a second mounting portion extending in a direction intersecting with the first direction and opposed to the third side surface,
the first light source is mounted on the first mounting portion, and
the second light source is mounted on the second mounting portion.

3. The electronic apparatus according to claim 2, wherein the second light source is a light-emitting diode having the light-emitting surface opposed to the third side surface.

4. An electronic apparatus, comprising:
a liquid crystal panel; and
an illumination device that illuminates the liquid crystal panel, wherein
the illumination device includes
a light guide having a first surface facing the liquid crystal panel, a first side surface, a second side surface on an opposite side of the first side surface, a recess portion recessed from the first side surface toward the second side surface on the first side surface, and a third side surface exposed by the recess portion and opposed to the second side surface,
a plurality of first light sources opposed to the first side surface,
a plurality of second light sources located in the recess portion and opposed to the third side surface,
a wiring board having a first mounting portion extending in a first direction and a second mounting portion extending in a direction intersecting with the first direction and opposed to the third side surface, and
a case that accommodates the light guide, the first light source, and the second light source,
the first light source is mounted on the first mounting portion,
the second light source is mounted on the second mounting portion,
the light guide has a second surface on an opposite side of the first surface,
the case has a bottom portion facing the second surface and a protruding portion protruding from the bottom portion, and
the second mounting portion is located between the protruding portion and the third side surface.

5. The electronic apparatus according to claim 4, wherein the illumination device further includes a tape that is located between the second mounting portion and the protruding portion, and fixes the second mounting portion to the protruding portion.

6. The electronic apparatus according to claim 4, further comprising
a photoreceiver, wherein
the bottom portion has an opening portion in which the photoreceiver is provided,
the protruding portion has an end portion located on an opposite side of the bottom portion, extends between the photoreceiver and the first light source and between the photoreceiver and the second light source, and surrounds the opening portion, and
each of the first light source and the second light source is located between the end portion and the bottom portion.

* * * * *